United States Patent
Kempka et al.

[11] Patent Number: 6,158,214
[45] Date of Patent: Dec. 12, 2000

[54] EXHAUST SILENCER ARRANGEMENT

[75] Inventors: Karl-Heinz Kempka, Rutesheim; Thomas Nording, Esslingen; Peter Strätz, Sindelfingen; Siegfried Wörner, Esslingen, all of Germany

[73] Assignees: Microcompact Car Smart GmbH, Renningen; J. Eberspacher GmbH & CO, Esslingen, both of Germany; a part interest

[21] Appl. No.: 09/142,969

[22] PCT Filed: Mar. 18, 1997

[86] PCT No.: PCT/EP97/01341

§ 371 Date: Jan. 25, 1999

§ 102(e) Date: Jan. 25, 1999

[87] PCT Pub. No.: WO97/35100

PCT Pub. Date: Sep. 25, 1997

[30] Foreign Application Priority Data

Mar. 21, 1996 [DE] Germany ............................ 196 11 133

[51] Int. Cl.[7] ...................................................... F01N 3/00
[52] U.S. Cl. ................... 60/302; 60/299; 60/312; 60/323; 181/212; 181/227; 181/255; 181/258; 181/269; 181/272; 181/282
[58] Field of Search .............................. 60/302, 299, 312, 60/323; 181/212, 227, 255, 258, 269, 272, 282

[56] References Cited

U.S. PATENT DOCUMENTS

| 4,416,350 | 11/1983 | Hayashi | 181/272 |
| 4,579,194 | 4/1986 | Shiki et al. | 181/231 |
| 4,894,987 | 1/1990 | Harwood et al. | 60/299 |
| 5,376,341 | 12/1994 | Gulati | 422/179 |
| 5,392,602 | 2/1995 | Matsumoto | 60/299 |
| 5,426,269 | 6/1995 | Wagner et al. | 181/232 |

FOREIGN PATENT DOCUMENTS

| 0 556 846 A1 | 8/1993 | European Pat. Off. |
| 0 563 882 A1 | 10/1993 | European Pat. Off. |
| 42 44 613 A1 | 7/1994 | Germany |
| 44 27 459 A1 | 2/1996 | Germany |
| 5-340234 | 12/1993 | Japan |

*Primary Examiner*—Willis R. Wolfe
*Assistant Examiner*—Sneh Varma
*Attorney, Agent, or Firm*—McGlew and Tuttle, P.C.

[57] ABSTRACT

The invention concerns an exhaust silencer arrangement with a transverse exhaust silencer in a four-chamber type of construction, in particular for very small passenger-transporting motor vehicles, with a 3-cylinder rear-mounted engine and an exhaust gas turbocharger. The silencer comprises a housing which is composed of two half shells and accommodates a catalyst module in an integrated manner. The catalyst module, which does not have its own housing, forms a silencer system partition which divides the silencer into a 3-pot main chamber and an additional chamber which is in particular a resonator chamber and communicates with the main chamber via connection ducts formed in the half-shell housing.

29 Claims, 2 Drawing Sheets

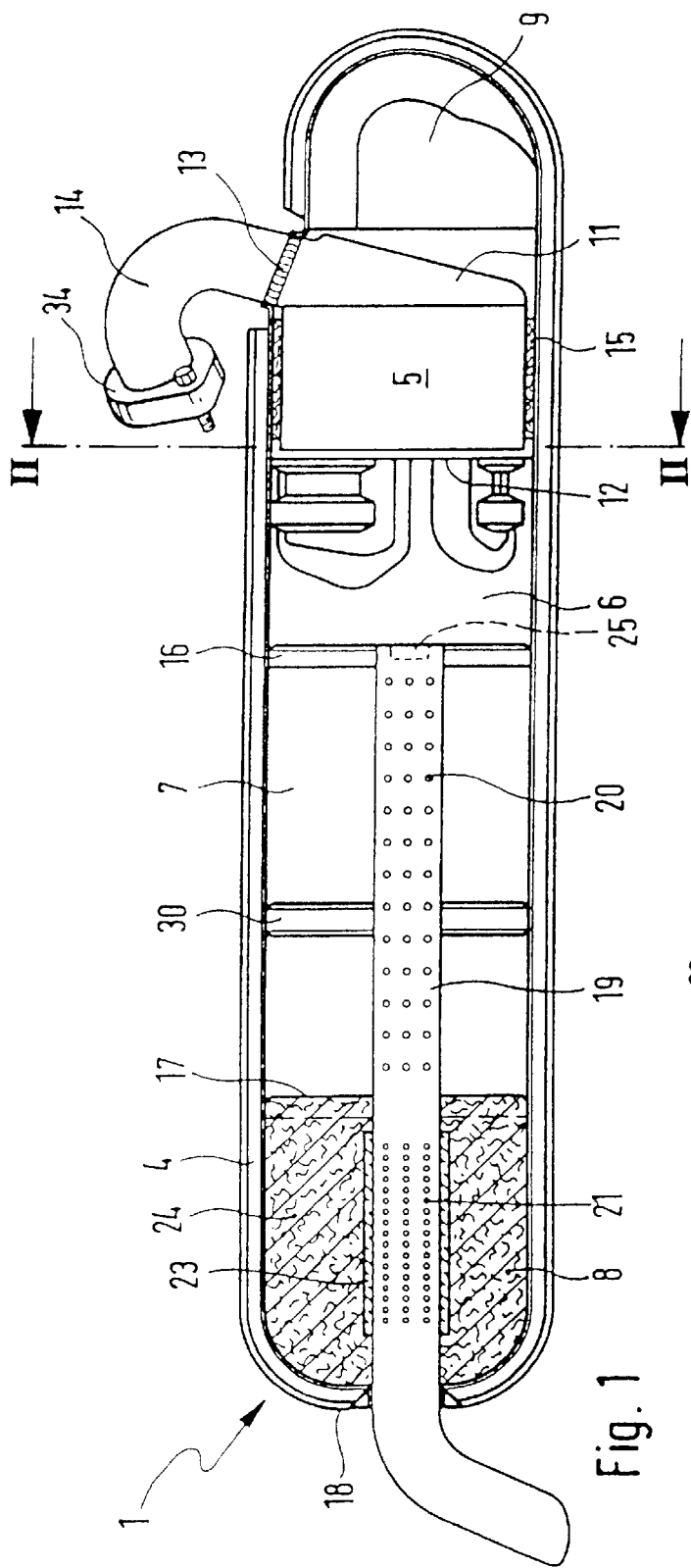
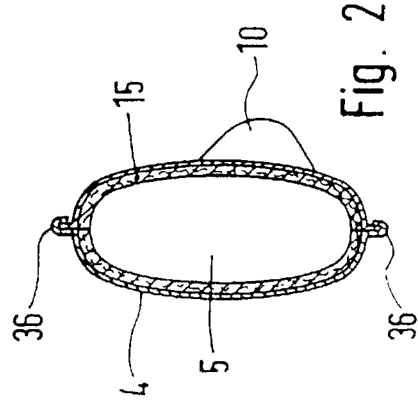
Fig. 1
Fig. 2

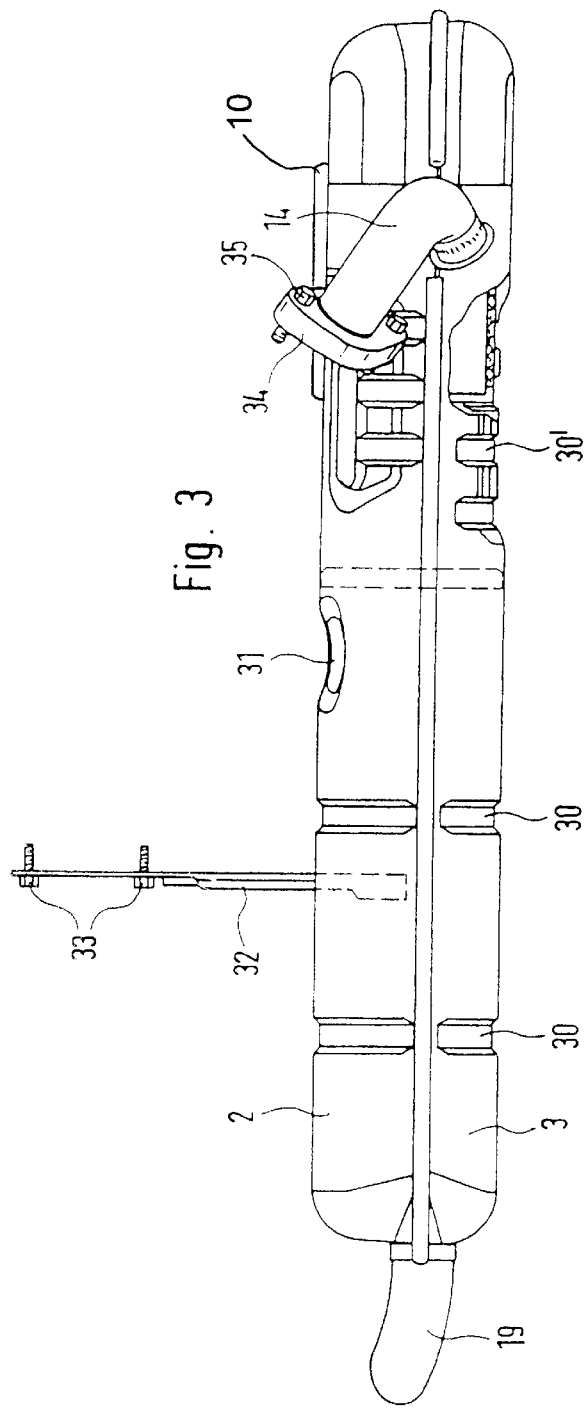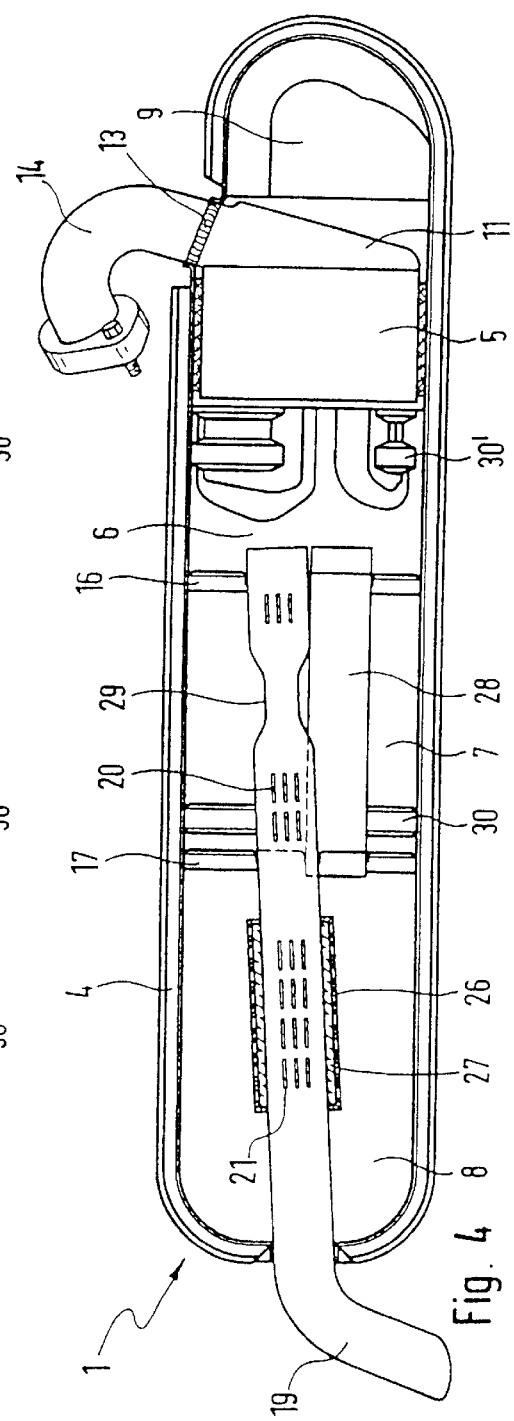

EXHAUST SILENCER ARRANGEMENT

FIELD OF THE INVENTION

The present invention pertains to an exhaust muffler arrangement with an exhaust muffler of a multichamber design, especially for passenger cars.

BACKGROUND OF THE INVENTION

An exhaust system of a motor vehicle has been known to have the task of drawing off the exhaust gases formed during the combustion of the fresh fuel mixture in the engine with a low flow resistance and of allowing the exhaust gases to escape at a defined point of the vehicle. This point is often stipulated by law. For a low-noise discharge of the exhaust gases into the atmosphere, the exhaust system has an exhaust muffler arrangement, and frequently an exhaust gas cleaning equipment, a so-called catalytic converter, for discharging the exhaust gases with a low emissions level. The catalytic converter usually replaces the front muffler of the exhaust muffler arrangement in the exhaust line in such a combined prior-art system and is arranged upstream of the rear muffler and optionally also of the middle muffler.

The essential components of a catalytic converter are known to be the catalyst support with its precious metal coating, preferably a monolith, and its housing. Inlet and outlet funnels may be provided.

Distinction is made, in principle, among the exhaust muffler arrangements between baffle mufflers and absorption mufflers. Both design principles may also be combined in one exhaust muffler. The design and the mode of operation are fundamentally the same.

SUMMARY AND OBJECTS OF THE INVENTION

The basic object of the present invention is to provide an exhaust muffler arrangement of the type mentioned in the introduction, which has a simple design, can be operated effectively and is especially suitable for very small motor vehicles with 3-cylinder engines.

Provisions are made according to the present invention for the housing of the exhaust muffler to be composed of two half shells and for a catalytic converter module to be also accommodated in the half shell housing in an integrated manner, wherein the separate housing of a prior-art catalytic converter module may be omitted.

The catalytic converter module is preferably designed as a wall or divider dividing the half shell housing into a main chamber and an auxiliary chamber, wherein the chambers are connected to one another via at least one connection channel integrated within the half shell housing.

The auxiliary chamber is an empty space for increasing the volume and as such a resonator chamber or a Helmholtz resonator, which communicates with the main chamber.

A simple design and an expedient mounting are achieved if the catalytic converter is fastened in the half shell housing by positive locking and/or by welding.

The cross section of the half shell housing along the catalytic converter is preferably essentially the same this forms a means for receiving catalytic converters of different length. Depending on the wishes or the type of the vehicle, catalytic converter modules of equal cross section but with different monolith length can therefore also be inserted into the half shell housing in a positive-locking manner (modular design of the catalytic converter, and the other individual parts of the exhaust muffler arrangement to be described below, namely, the inner structure of the exhaust muffler and the housing, may be modular as well).

The catalytic converter module preferably has an oblique inlet funnel on the side of the auxiliary chamber and an open, i.e., outlet flow side without funnel at the side of the main chamber. The oblique flow leads to an optimal flow distribution with the advantage of a very short start-up time of the catalytic converter as well as a good long-term stability of the coating of the catalytic converter. Due to the open discharge from the catalytic converter without an outlet funnel, only a low exhaust gas pressure builds up during the operation and the loss of power is consequently minimal, which is especially important for engines with an exhaust gas turbocharger.

The oblique inlet funnel advantageously extends through a jacket opening of the half shell housing and is sealingly fixed, especially welded, in that jacket opening, at least in the axial or longitudinal direction of the half shell housing.

The oblique inlet funnel preferably has a short, preferably bent connection pipe section, which may be connected to an exhaust gas turbocharger or directly to an engine, especially a rear engine.

The monolith jacket of the catalytic converter module has a circumferential insulation for mounting in the half shell housing, while the oblique inlet funnel is made without an additional insulation, and efficient operation of the catalytic converter is nevertheless possible.

The elongated main chamber, extending essentially over the length of the main chamber having the same cross section, is designed in a special embodiment of the present invention as a three-chamber pot (i.e., the exhaust muffler arrangement combined with the catalytic converter together with the auxiliary Helmholtz chamber as a four-chamber pot) and is divided as such into three individual chambers by two intermediate walls or bottoms located at spaced locations from one another. The first individual chamber extends between the catalytic converter module and the first intermediate bottom in the axial or longitudinal direction of the main chamber. The second individual chamber extends between the first intermediate bottom and the second intermediate bottom. The third individual chamber extends between the second intermediate bottom and a front-side end of the half shell housing.

In an especially expedient variant of the present invention, the first individual chamber joins an outlet tube, which is located inside the exhaust muffler and extends to the outside through the second individual chamber, the third individual chamber and the associated front-side end of the half shell housing, wherein the outlet pipe inside the half shell housing may extend essentially in parallel to the longitudinal axis of the half shell housing or alternatively at an angle of slope to the longitudinal axis of the half shell housing.

The outlet pipe preferably has first jacket-side passage openings in the area of the second individual chamber and second jacket-side passage openings in the area of the third individual chamber, wherein the second jacket-side passage openings may be provided with a circumferential insulation on the outside.

In one embodiment variant of the present invention, the first and second individual chambers are designed basically as baffle chambers, wherein the first individual chamber may also be a resonator chamber in the manner of the auxiliary chamber.

The third individual chamber may be designed as a pure absorption chamber and be provided with a sound-absorbing material outside the outlet pipe. However, as will be specifically described below, it may also be a pure baffle chamber or even a baffle chamber that contains a so-called absorption package, i.e., a combined absorption/baffle chamber.

The second individual chamber preferably has a larger longitudinal extension than the third individual chamber, which was revealed empirically by experiments to be favorable.

If the third individual chamber is designed as a baffle chamber, the first jacket-side passage openings advantageously have a larger diameter than the second jacket-side passage openings, which preferably have a round cross section.

The front-side intake opening of the outlet pipe is preferably located in the area of the first intermediate bottom and has a tapering intake throttle if the third individual chamber is designed as an absorption chamber.

The first intermediate bottom is preferably perforated, and it may also be non-perforated, especially when the third individual chamber is designed as a pure baffle chamber with an absorption package.

If the third individual chamber is designed as a baffle chamber, it comprises, as was already mentioned, an absorption package preferably with a suction sleeve, which extends coaxially to the outlet pipe and is located at a spaced location therefrom, in the area of the outer circumference of the second jacket-side passage openings, wherein a circumferential insulation is provided between the suction sleeve and the outlet pipe.

The suction sleeve may have perforations, and the first individual chamber is preferably connected to the third, combined individual absorption/baffle chamber via an auxiliary pipe ("bypass"), which is located inside the exhaust muffler and extends through the second individual chamber. The third and first individual chambers are therefore additionally connected via a pipe member, which creates great "effective damping lengths" despite the compact design of the entire exhaust muffler arrangement especially due to the additional coupling of the auxiliary Helmholtz chamber via the additional "pipe member" in the form of the jacket-side overflow channel in parallel to the catalytic converter module.

The cross section of the outlet pipe is preferably tapered in the area of the second individual chamber with substantially continuous transitions. The first and second jacket-side passage openings are advantageously designed as elongated holes here. The first jacket-side passage openings are located on both sides of the aforementioned cross section taper, relative to the axial extension of the exhaust muffler.

To reduce solid-borne sound, the half shell housing preferably has stabilizing indentations, which may preferably extend practically over the entire circumference in parallel to the intermediate bottoms.

Local stabilizing indentations are also conceivable, especially in areas in which other individual parts of the structure are to be located on the outside of the jacket when the exhaust muffler arrangement is mounted in a motor vehicle, e.g., a local indentation for an axle bearing of the vehicle located close to the jacket.

The exhaust muffler arrangement is especially advantageous if it or the half shell housing extends transversely in mounted state with respect to the vehicle, especially if it extends practically over the entire width of a small motor vehicle, a so-called subcompact car, and coupled via a short pipe to an adjacent rear engine of the vehicle, with an intercalated exhaust gas turbocharger.

It shall be mentioned that the catalytic converter module may also be arranged laterally transposed in the half shell housing, i.e., it may have the oblique inlet funnel on the side of the main chamber and the open discharge side without a funnel on the side of the auxiliary chamber. The auxiliary chamber is not a resonator chamber in this case, but exhaust gas flows through it during the operation before it flows to the main chamber via the jacket-side connection channels integrated within the housing.

The essential functional features will be reviewed once again below:

- The catalytic converter/exhaust muffler is provided as a single structural unit directly after an exhaust gas turbocharger with minimal front pipe length.
- The catalytic converter module with variable monolith length is integrated as an independent manufacturing unit in the exhaust muffler half shell housing, connected either by welding or by positive locking.
- The catalytic converter body inserted into the exhaust muffler shell divides the volume of the exhaust muffler into a resonator or Helmholtz chamber and a main chamber, and thus assumes the auxiliary function of a system separating bottom or wall.
- The catalytic converter module has a discharge open on one side into the exhaust muffler housing, wherein the following exhaust muffler functional design consisting of a baffle part and an absorption part is obtained.
- The resonator chamber and the main chamber are coupled by one or more overflow channels integrated within the half shell housing.
- The main chamber of the exhaust muffler is designed as a three-chamber baffle/absorption system with integrated outlet spray and an overflow throttle in the intermediate bottom or wall.
- As an alternative, the main chamber of the exhaust muffler is designed as a three-chamber baffle system with an absorption package attached to the outlet pipe and an overflow throttle and an additional bypass pipe.
- The absorption package is additionally coupled with the third individual chamber or end chamber via a perforated suction sleeve.

The essential advantages of the system according to the present invention are reviewed as follows:

- Due to the catalytic converter module being arranged in the exhaust muffler housing and the optimal flow distribution as a consequence of the oblique arriving flow, a very short start-up time of the catalytic converter and good long-term stability of the catalytic coating are achieved.
- The open discharge from the catalytic converter into the exhaust muffler housing leads to a low exhaust gas pressure and consequently to a minimal power loss of the engine, especially in the presence of an exhaust gas turbocharger.
- Due to the complete catalytic converter module being integrated in the exhaust muffler housing, the radiation of solid-borne sound is substantially reduced. In addition, the insulation of the inlet funnel of the catalytic converter may be abandoned.
- Due to the system being divided into different manufacturing modules (catalytic converter/exhaust muffler inner structure/housing), an efficient and cost-saving manufacture is possible.

A substantial reduction in weight is achieved due to the combination of the individual manufacturing modules with multiple functions into one functional unit.

The above-mentioned features of the present invention and the features yet to be explained may, of course, be used not only in the combination described, but also in combinations or alone without leaving the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 schematically shows a horizontal longitudinal section of an exhaust muffler arrangement with integrated catalytic converter module, FIG. 2 shows a schematic cross section through the exhaust muffler arrangement according to FIG. 1 along line II—II, FIG. 3 shows a side view of the exhaust muffler arrangement according to FIG. 1, and FIG. 4 shows another embodiment variant of an exhaust muffler arrangement similar to that in FIG. 1.

DESCRIPTION OF THE PREFERRED EMBODIMENT

According to the drawing, an exhaust muffler arrangement comprises an exhaust muffler 1 of a multichamber design, which is provided in a passenger car of the compact class with a three-cylinder rear engine, whose exhaust gas outlet is connected to an exhaust gas turbocharger and whose outlet is connected with a short pipeline to the exhaust muffler arrangement illustrated. The exhaust muffler arrangement is arranged transversely in relation to the vehicle and it extends horizontally practically over the entire width of the compact motor vehicle.

The housing 4 of the exhaust muffler 1 is elongated and has practically the same oval basic cross section over its entire length. It comprises an upper half shell 2 and a lower half shell 3, which are shaped sheet metal parts. The two half shells 2, 3 are connected to one another via a lock seam 36 by positive locking in a gas-sealing manner.

A catalytic converter module 5 having no housing is accommodated in the half shell housing 4, especially in a positive-locking manner and basically axially displaceably along the circumference of the monolith of the catalytic converter module 5, wherein the monolith has a circumferential insulation 15 for mounting.

However, the catalytic converter module 5 is axially fixed in the housing in the assembled state, it being fixed by its inlet funnel 11, which permits an oblique arriving flow to the monolith and therefore an optimal flow distribution in the catalytic converter. The oblique, circumferentially not insulated inlet funnel 11 extends through a radial jacket opening 13 in the half shell housing 4. This jacket opening 13 is adapted in terms of its shape to accommodate the funnel 11. The funnel 11 is welded at the jacket opening 13 in a gas-sealing manner to form a radial separating bottom for the catalytic converter module 5.

The funnel 11 passes over on the outside of the exhaust muffler into a short, bent connection pipe section 14, whose free end is provided with a ball flange 34. The ball flange has cap screws 35 for connecting the exhaust muffler arrangement to an exhaust gas turbocharger.

Furthermore, a vertical holder 32, which can be fastened to the vehicle chassis by means of screws 33 in order to fasten the exhaust muffler arrangement as a whole under the floor of the vehicle in a stable manner, is welded to the upper half shell 2 of the half shell housing 4 at a point that is a remote point relative to the connection pipe section 14.

The catalytic converter module 5 has an open discharge side 12, i.e., one without a funnel, on the side facing away from the inlet funnel 13, so that a low exhaust gas pressure is present during the operation.

The above-described arrangement of the catalytic converter module 5 in the half shell housing 4 of the exhaust muffler arrangement is made such that the catalytic converter module 5 forms an exhaust muffler system separating bottom and it divides the half shell housing 4 into a main chamber located to the left of the catalytic converter according to FIG. 1 and an auxiliary chamber 9 located on the other side, wherein the chambers are connected to one another via at least one connection channel 10 integrated within the half shell housing 4, as can be seen especially in FIG. 2.

The auxiliary chamber 9 is an empty space for enlarging the volume and as such a resonator chamber or a Helmholtz resonator, which communicates with the main chamber.

The catalytic converter module 5 is arranged such that its open discharge side 12 points in the direction of the main chamber.

The elongated main chamber, which has essentially the same cross section over its length, is designed according to the drawing as a three-chamber pot (i.e., the exhaust muffler arrangement combined with the catalytic converter together with the auxiliary Helmholtz chamber as a four-chamber pot) and is divided as such by two intermediate bottoms or walls 16, 17 arranged at spaced locations from one another into three individual chambers 6, 7, 8, wherein the first individual chamber 6 extends between the catalytic converter module 5 and the first intermediate bottom or wall 16 in the axial or longitudinal direction of the main chamber, the second individual chamber 7 extends between the first intermediate bottom 16 and the second intermediate bottom or wall 17, and the third individual chamber 8 extends between the second intermediate bottom 17 and the front-side end 18 of the half shell housing 4, which is the left-hand end according to FIGS. 1, 3 and 4.

The first individual chamber 6 is connected to an outlet pipe 19, which is arranged inside the exhaust muffler and is designed as a straight pipe inside the exhaust muffler. The outlet pipe 19 extends according to FIG. 1 axially through the second individual chamber 7, the third individual chamber 8 and, from there, through the associated front-side end 18 of the half shell housing 4 to the outside and is bent as an end pipe of the exhaust system in the outer area.

The outlet pipe 19 has first jacket-side passage openings 20 in the area of the second individual chamber 7 and second jacket-side passage openings 21 in the area of the third individual chamber 8, wherein the second jacket-side passage openings 21 are provided with a circumferential insulation 23 on the outside according to the exemplary embodiment according to FIGS. 1 through 3. The third individual chamber 8 is filled as a whole with a sound-absorbing material 24 outside the outlet pipe 19, i.e., the third individual chamber 8 is designed as an absorption chamber.

The first jacket-side, round passage openings 20 have a larger diameter than the second jacket-side, round passage openings 21.

The space between the half shell housing 4 and the outlet pipe 19 in the area of the second individual chamber 7 is an empty space. The second individual chamber 7 is therefore designed as a baffle chamber.

The front-side intake opening of the outlet pipe 19 extends flush with the first intermediate bottom 16 and has a central, tapering intake throttle 25.

The first intermediate bottom 16 according to FIG. 1 is perforated.

To reduce solid-borne sound, the half shell housing 4 has stabilizing indentations 30, which preferably extend practically over the entire circumference in parallel to the intermediate bottoms.

Local stabilizing indentations 31, 30' are also provided, especially in areas in which other individual structural parts, e.g., an axle bearing of a motor vehicle located close to the jacket, are located on the outside of the jacket.

The local stabilizing indentations 31 are located in the area of the second individual chamber 7, while the local stabilizing indentations 30' are provided in the area of the first individual chamber 6 and are preferably located in the connection channel 10 or the overflow channel to the auxiliary channel 9.

Thus, a four-chamber pot with one absorption chamber (third individual chamber 8), two baffle chambers (first and second individual chambers 6, 7) and one resonator chamber (auxiliary chamber 9) are created according to FIGS. 1 through 3, and a catalytic converter module 5 having no housing is arranged, integrated in terms of shape, between the auxiliary chamber 9 and the first individual chamber 6 as a separating bottom. The catalytic converter module is located here in the area of the flow inlet of the exhaust muffler arrangement. The exhaust gases of the engine, which are introduced into the catalytic converter, are still relatively hot.

The exemplary embodiment according to FIG. 4 corresponds, in principle, to that according to FIGS. 1 through 3. However, the third individual chamber 8 is designed as a combined absorption/baffle chamber.

In particular, the outlet pipe 19 is provided in the area of the second jacket-side passage openings 21 with an absorption package, which covers the passage openings 21. The absorption package comprises a perforated suction sleeve 26 concentrically surrounding the outlet pipe at a spaced location and an embedded circumferential insulation 27.

The first individual chamber 6 is connected to the third individual, combined absorption/baffle chamber 8 via an axis-parallel auxiliary pipe 28 ("bypass"), which is located inside the exhaust muffler and extends through the second individual chamber 7.

The outlet pipe 19, which is arranged obliquely in relation to the longitudinal axis of the exhaust muffler arrangement, has a cross section taper 29 with continuous transitions in the area of the second individual chamber 7.

The first and second jacket-side passage openings 20, 21 are designed as elongated holes. The first openings 20 extend on both sides of the aforementioned cross section taper 29 relative to the axial extension of the exhaust muffler.

The auxiliary pipe 28 and the outlet pipe 19 extend with a short pipe section into the first individual chamber 6.

It should also be mentioned that independently patentable features contained in the subclaims shall have independent protection despite the formal reference made to the principal claim. All the inventive features contained in all the application documents also fall within the scope of protection of the present invention.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

What is claimed is:

1. An exhaust muffler arrangement comprising:

a housing;

a catalytic converter module positioned in said housing, said converter module dividing an interior of said housing into a main chamber and an auxiliary chamber formed as a resonance chamber, said housing defining a cross section of said main chamber and said resonance chamber, said catalytic converter having a cross section substantially equal to said cross section of one of said main chamber and said resonance chamber;

a connection channel integrated in said housing and connecting said main chamber and said resonance chamber, said main chamber and said resonance chamber communicating through said connection channel.

2. An arrangement in accordance with claim 1, wherein:

said housing is composed of two half shells;

said catalytic converter module is accommodated in said housing in an integrated manner;

said catalytic converter module is provided with a discharge side open on one side into said housing;

said resonance chamber is a Helmholtz resonator;

said catalytic converter module is fastened in said housing by one of positive locking and by welding;

said housing has stabilizing indentations;

said housing extends transversely in a mounted state in a vehicle.

3. An arrangement in accordance with claim 1, wherein:

a cross section of said housing is substantially constant along said converter module and forms means for receiving varying lengths of said converter modules in a positive locking manner.

4. The arrangement in accordance with claim 1, wherein:

said catalytic converter includes a radial separating bottom on a side of said catalytic converter facing said resonance chamber, said radial separating bottom having a radial opening through said housing.

5. The arrangement in accordance with claim 1, wherein:

said resonance chamber has only one channel communicating with said main chamber.

6. An exhaust muffler arrangement comprising:

a housing;

a catalytic converter module positioned in said housing, said converter module dividing an interior of said housing into a main chamber and an auxiliary chamber formed as a resonance chamber, said catalytic converter module having an oblique inlet funnel on one side of said auxiliary chamber, said catalytic converter module having an outlet flow side on one side of said main chamber;

a connection channel integrated in said housing and connecting said main chamber and said resonance chamber, said main chamber and said resonance chamber communicating through said connection channel.

7. An arrangement in accordance with claim 6, wherein:

said oblique inlet funnel extends through a jacket opening of said housing and said oblique inlet funnel is sealingly fixed in said jacket opening.

8. An arrangement in accordance with claim 7, wherein:
said oblique inlet funnel has a connection pipe section which can be connected to one of an exhaust gas turbocharger and directly to an engine.

9. An arrangement in accordance with claim 6, wherein:
said catalytic converter module has a monolith jacket with circumferential insulation for mounting in said housing;
said oblique inlet funnel is made without an additional insulation layer.

10. An exhaust muffler arrangement comprising:
a housing;
a catalytic converter module positioned in said housing, said converter module dividing an interior of said housing into a main chamber and an auxiliary chamber formed as a resonance chamber, said main chamber has a substantially constant cross section and is divided by first and second intermediate walls located at spaced locations from one another, said intermediate walls divide said main chamber into first, second and third individual chambers, said first individual chamber extends between said catalytic converter module and said first intermediate wall in an axial direction of said main chamber, said second individual chamber extends between said first intermediate wall and said second intermediate wall, and said third individual chamber extends between said second intermediate wall and an end of said housing;
a connection channel integrated in said housing and connecting said main chamber and said resonance chamber, said main chamber and said resonance chamber communicating through said connection channel.

11. An arrangement in accordance with claim 10, wherein:
an outlet pipe is located inside the housing and is connected to said first individual chamber, said outlet pipe extends through said second individual chamber, said third individual chamber and said end of said housing.

12. An arrangement in accordance with claim 11, wherein:
said outlet pipe extends essentially in parallel to a longitudinal axis of said housing.

13. An arrangement in accordance with claim 11, wherein:
said outlet pipe extends at an angle to a longitudinal axis of said housing.

14. An arrangement in accordance with claim 11, wherein:
said outlet pipe has first jacket-side passage openings in said second individual chamber, and said outlet pipe has second jacket-side passage openings in said third individual chamber.

15. An arrangement in accordance with claim 14, wherein:
said second jacket-side passage openings are provided with a circumferential insulation on an outside of said outlet pipe.

16. An arrangement in accordance with claim 15, wherein:
said first and second individual chambers are designed as baffle chambers.

17. An arrangement in accordance with claim 14, wherein:
said third individual chamber is designed as an absorption chamber and is filled with a sound-absorbing material outside said outlet pipe;
said first jacket-side passage openings have a larger diameter than said second jacket-side passage openings.

18. An arrangement in accordance with claim 11, wherein:
said third individual chamber is designed as an absorption chamber and is filled with a sound-absorbing material outside said outlet pipe.

19. An arrangement in accordance with claim 18, wherein:
said second individual chamber has a greater longitudinal extension than the said third individual chamber.

20. An arrangement in accordance with claim 18, wherein:
said outlet pipe has first jacket-side passage openings in said second individual chamber, and said outlet pipe has second jacket-side passage openings in said third individual chamber, said first and second jacket-side passage openings are round.

21. An arrangement in accordance with claim 18, wherein:
an inlet opening of said outlet pipe is located in an area of said first intermediate wall.

22. An arrangement in accordance with claim 21, wherein:
said inlet opening of said outlet pipe has a tapering intake throttle.

23. An arrangement in accordance with claim 18, wherein:
said first intermediate wall is perforated.

24. An arrangement in accordance with claim 10, wherein:
said third individual chamber is designed as a baffle chamber.

25. An arrangement in accordance with claim 24, wherein:
an outlet pipe is located inside the exhaust muffler and is connected to said first individual chamber, said outlet pipe extends through said second individual chamber, said third individual chamber and said end of said housing, said outlet pipe has first jacket-side passage openings in said second individual chamber, and said outlet pipe has second jacket-side passage openings in said third individual chamber, said third individual chamber has an absorption package with a suction sleeve in an area of an outer circumference of said second jacket-side passage openings, said suction sleeve extends coaxially to said outlet pipe and is located at a spaced location therefrom;
a circumferential insulation is provided between said suction sleeve and said outlet pipe.

26. An arrangement in accordance with claim 25, wherein:
said suction sleeve has perforations.

27. An arrangement in accordance with claim 24, wherein:
said first individual chamber is connected to said third individual chamber via an auxiliary pipe located inside said housing and extending through said second individual chamber.

28. An arrangement in accordance with claim 25, wherein:
said outlet pipe has a cross section taper with substantially continuous transitions in an area of said second individual chamber.

29. An arrangement in accordance with claim 25, wherein:
said first and second jacket-side passage openings are elongated holes.

* * * * *